(12) United States Patent
Sasahara et al.

(10) Patent No.: US 6,412,057 B1
(45) Date of Patent: Jun. 25, 2002

(54) MICROPROCESSOR WITH VIRTUAL-TO-PHYSICAL ADDRESS TRANSLATION USING FLAGS

(75) Inventors: Masashi Sasahara, Kawasaki (JP);
Rakesh Agarwal, Palo Alto, CA (US);
Kamran Malik, San Jose, CA (US);
Michael Raam, Cupertino, CA (US)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/246,407

(22) Filed: Feb. 8, 1999

(51) Int. Cl.$^7$ ............................................... G06F 12/00
(52) U.S. Cl. ..................................................... 711/202
(58) Field of Search ............................... 711/139, 138, 711/206, 207, 202, 203, 205, 208, 209, 220, 221; 710/3, 4, 22, 23, 26, 52, 57

(56) References Cited

U.S. PATENT DOCUMENTS

| | | | | |
|---|---|---|---|---|
| 4,654,791 A | * | 3/1987 | Ushiro ........................ 364/200 |
| 5,606,683 A | | 2/1997 | Riordan ....................... 711/207 |
| 5,749,093 A | * | 5/1998 | Kobayashi et al. ......... 711/139 |
| 5,749,094 A | * | 5/1998 | Jaggar ......................... 711/139 |
| 5,765,194 A | * | 6/1998 | McBride ..................... 711/138 |

* cited by examiner

Primary Examiner—Matthew Kim
Assistant Examiner—C. P. Chace
(74) Attorney, Agent, or Firm—Gray Cary Ware & Freidenrich LLP (57) ABSTRACT

A microprocessor includes an MMU which converts from a virtual address to a physical address, and an LSU which controls an execution of a load/store instruction. The LSU includes a DCACHE which temporarily stores data to read out from and to write into an external memory, an SPRAM used for a specific purpose besides caching, and an address generator which generates the virtual address to access the DCACHE and the SPRAM. The MMU generates a conversion table which performs a conversion from the virtual address to the physical address. A flag information showing whether or not the access to the SPRAM is performed is included in this conversion table. The LSU absolutely accesses the SPRAM if the flag is being set. Accordingly, it is unnecessary to allocate the SPRAM to a memory map of the main memory, and the allocation of the memory map simplifies.

18 Claims, 5 Drawing Sheets

MICROPROCESSOR WITH VIRTUAL-TO-PHYSICAL ADDRESS TRANSLATION USING FLAGS

TECHNICAL FIELD

The present invention relates to the internal configuration of a microprocessor which is able to read and write data more quickly than external memories.

BACKGROUND

A memory and I/O devices accessible to a processor are known as external devices. Because the memory is connected to almost all the processors, the memory is generally allocated directly to a memory map of the processors. On the other hand, because the I/O devices need a small address range, the I/O devices are typically managed by either of the following two methods.

(1) The I/O region is allocated to a specific memory space that the processor accesses with specific I/O instructions. For example, x86 processors of Intel Corp. have the I/O region other than an ordinary memory region, and the access to the I/O region is explicitly performed by in/out instruction.

(2) The I/O devices are allocated on a memory map of an ordinary main memory. For example, the processors based on a MIPS architecture access the I/O region by using the same instructions as those used for ordinary memory operations.

Recent processors have generally adopted the method (2) of the above-mentioned two methods. Because the method (2) can use the same instructions as those for ordinary access to the memory, the instruction set is simplified and programming is thus easier. However, when the processor accesses the I/O devices, it is necessary to use an accessing method which is different from that for the ordinary memory. Specifically, when the processor accesses the I/O devices, (i) the cache memory should not be used, (ii) the order of reading out from and writing into the I/O region should be assured.

Though many processors assure the order of reading out from and writing into the same address, in the case when a plurality of registers of one I/O device are allocated to a plurality of addresses, the order of reading out from and writing into the I/O region may not be assured.

As a result, a processor which performs "out-of-order" process interchanging, to interchange the order of executing instructions needs to be specifically addressed.

Furthermore, as a result of recent high-integration technique of the semiconductor and DRAM mixed technique, it is possible to accommodate a high-speed memory besides the cache memory inside the processor and to use this memory for a purpose which is different from the main memory or the cache memory.

However, if such high-speed memory is mapped to a portion of the memory space of the main memory, because the external memory and the I/O devices cannot be allocated to that mapped portion, the allocation of the memory map is restricted.

Furthermore, because the processor can access data on such kinds of the memory at high speed, if the data on such kind of the memory is registered with the cache memory, it may needlessly displace data caching causing the external memory to refill. Additionally, it requires an extra datapath to refill data from such kind of memory to the cache memory.

On the other hand, if the highs-speed memory contents are not cached, the kind of memory to be accessed, (that is, the high-speed memory or the cache memory) has to be automatically determined before such access.

SUMMARY

An object of the present invention is to provide a microprocessor comprising a RAM which is available for a purpose besides a cache memory, and which is able to access the RAM easily and at high speed.

In order to achieve the foregoing object, a microprocessor comprising:

a memory management unit for converting a virtual address to a physical address;

a load/store instruction executing block for executing a load/store instruction;

a RAM (Random Access Memory), from and to which said load/store instruction executing block is able to read and write data, wherein said memory management unit includes a flag information generating block for generating a first flag information showing whether or not an access to said RAM is performed.

Because the processor according to the present invention determines by a first flag information whether or not the access to the RAM is performed, it is possible to access the RAM at high speed. That is, when accessing the memories, because it is unnecessary to refer to the result of "cache-hit" or "cache-miss", it is possible to access the RAM without any additional delay to determine the destination of the memory access.

Furthermore, if such kind of the flag information is provided, because it is possible to access the above mentioned RAM by using the same instructions as those for the ordinary access to the memories, it is possible to simplify an instruction set and a programming model can be simplified.

Similarly, whether or not the access to an I/O region is performed is determined by a second flag information, it is therefore unnecessary to allocate a specific memory region for the I/O devices.

DTAILED DESCRIPTION

Figure 1:
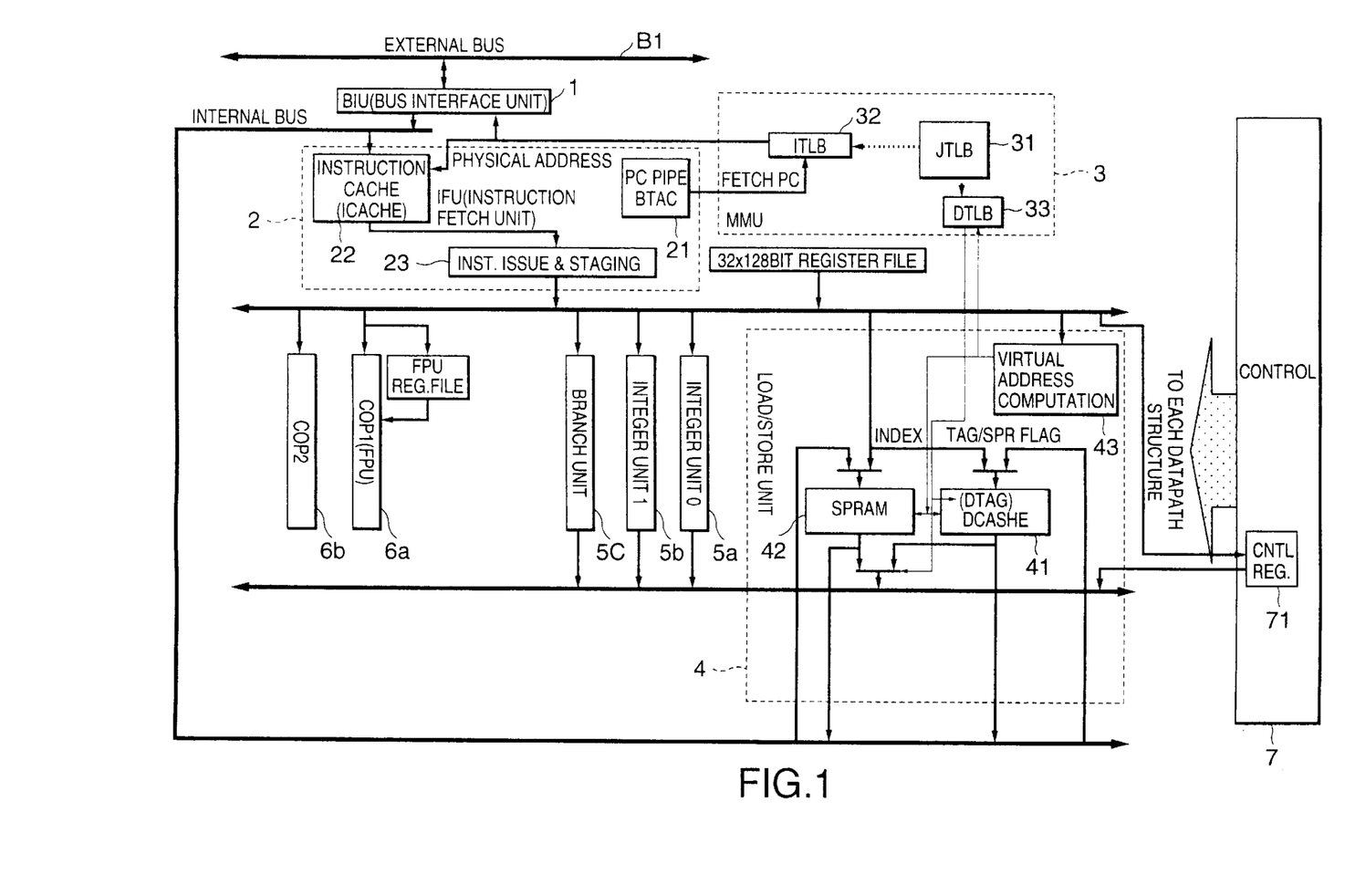
FIG. 1 is a block diagram showing an internal configuration of a microprocessor according to an embodiment of the present invention.

A microprocessor according to an embodiment of the present invention is now described in detail with reference to the attached drawings. FIG. 1 is a block diagram showing an internal configuration of the microprocessor. The microprocessor of FIG. 1 has a BIU (Bus Interface Unit) 1 connected to an external bus B1, an IFU (Instruction Fetch Unit) 2 which fetches instructions executed by a processor, an MMU (Memory Management Unit) 3 which converts virtual addresses to physical addresses, an LSU (Load Store Unit) 4 which executes instructions relating to load/store, a plurality of executing units 5a, 5b and 5c which execute instructions other than load/store, FPU (Floating Point Units) 6a, 6b and 6c which execute floating radix point calculation, a Control Logic 7 which controls each block in the processor.

The IFU 2 includes a PC-pipe 21 which generates a PC (Program Counter) by referring to the BTAC which stores the branch address of an instruction such as a branch instruction, an ICACHE (Instruction Cache memory) 22 which temporarily stores the instructions, and an Instruction Issue & Staging block 23 which recognizes the type of the instructions and selects an executing unit to execute the recognized instructions.

MMU 3 has three TLBs (Translation Lookaside Buffers) which convert the virtual addresses to physical addresses. Address converting information needed by the processor, such as a physical page number and memory protection information, is written to the TLBs. Based on this information, the MMU 3 executes the conversion to the physical address.

Three types of the TLBs in the MMU 3 are a JTLB (Joint Translation Lookaside Buffer) 31, an ITLB (Instruction Translation Lookaside Buffer) 32, and a DTLB (Data Translation Lookaside Buffer) 33.

The ITLB 32 and the DTLB 33 are called a micro TLB as a generic name. The ITLB 32 is a specific TLB connected directly to a datapath of the virtual address of the instructions. The DTLB 33 is a specific TLB connected directly to datapath of the virtual address of data. These TLBs have few entries, and execute address conversion at high speed. A portion of a conversion table generated by the JTLB 31 is transferred to the ITLB 32 or the DTLB 33 as necessary.

The JTLB 31 is controlled by the software, while the coherency between micro TLBs and the JTLB is maintained by the hardware. The processor issues an exception when there is no conversion table in the JTLB 31. An exception handler searches the corresponding page from a page table maintained by an OS (Operating System) and writes the information of the conversion table 100 into the JTLB 31.

The LSU 4 comprises a DCACHE (Data Cache Memory) 41 which temporarily stores data read out from and written into the external memory, an SPRAM (Scratch Pad RAM) 42 used for a specific purpose other than caching, and an address generator (Virtual Address Computation) 43 which generates the virtual address necessary to access the DCACHE 41 and the SPRAM 42.

The Control Logic 7 controls each block in the processor. Inside the Control Logic 7, a Control Register 71 is provided.

Next, the operation of the microprocessor of FIG. 1 will be explained. First of all, the IFU 2 fetches the instructions based on the PC generated by the PC-pipe 21. Here, the PC is a virtual address.

The ITLB 32 converts the PC from the virtual address to the physical address. The physical address is employed to search for an ITAG in the ICACHE 22. The physical address is used to detect whether or not the instruction designated by the PC exists in the ICACHE 22. When the instruction designated by the PC does not exist in the ICACHE 22, that is, when a cache-miss occurs, the access to the external memory (not shown) by the physical address is performed.

When a cache-miss occurs, information informing of the occurrence of the cache-miss and physical address information of the external memory location access are delivered to a Control Logic in the BIU 1. The BIU 1 accesses the external memory based on this information. When the access to the memory finishes, data and a signal informing of acquisition of the cache line are supplied to the IFU 2. The IFU 2 writes the data obtained by the access to the memory into the ICACHE 22. At the same time, among the instructions included in the refilled cache line, the instruction designated by the PC and in certain cases, several instructions following the instruction designated by the PC are supplied to the Instruction issue & Staging block 23.

On the other hand, if the instruction designated by the PC exists in the ICACHE 22, the corresponding instructions in the ICACHE 22 and in certain cases, several instructions following the instruction designated by the PC are supplied to the Instruction Issue & Staging block 23.

The Instruction Issue & Staging block 23 recognizes the type of the instructions and determines the executing unit to execute the instructions, for example, the LSU 4 or another executing unit. On this occasion, the Instruction issue & staging block 23 determines any one of the executing units dynamically in accordance with a vacancy status of each executing unit.

For example, when the recognized instruction is a load/store instruction, because only the LSU 4 is able to execute the instruction, the Instruction Issue & Staging block 23 sends the instruction only to the LSU 4.

Figure 2:
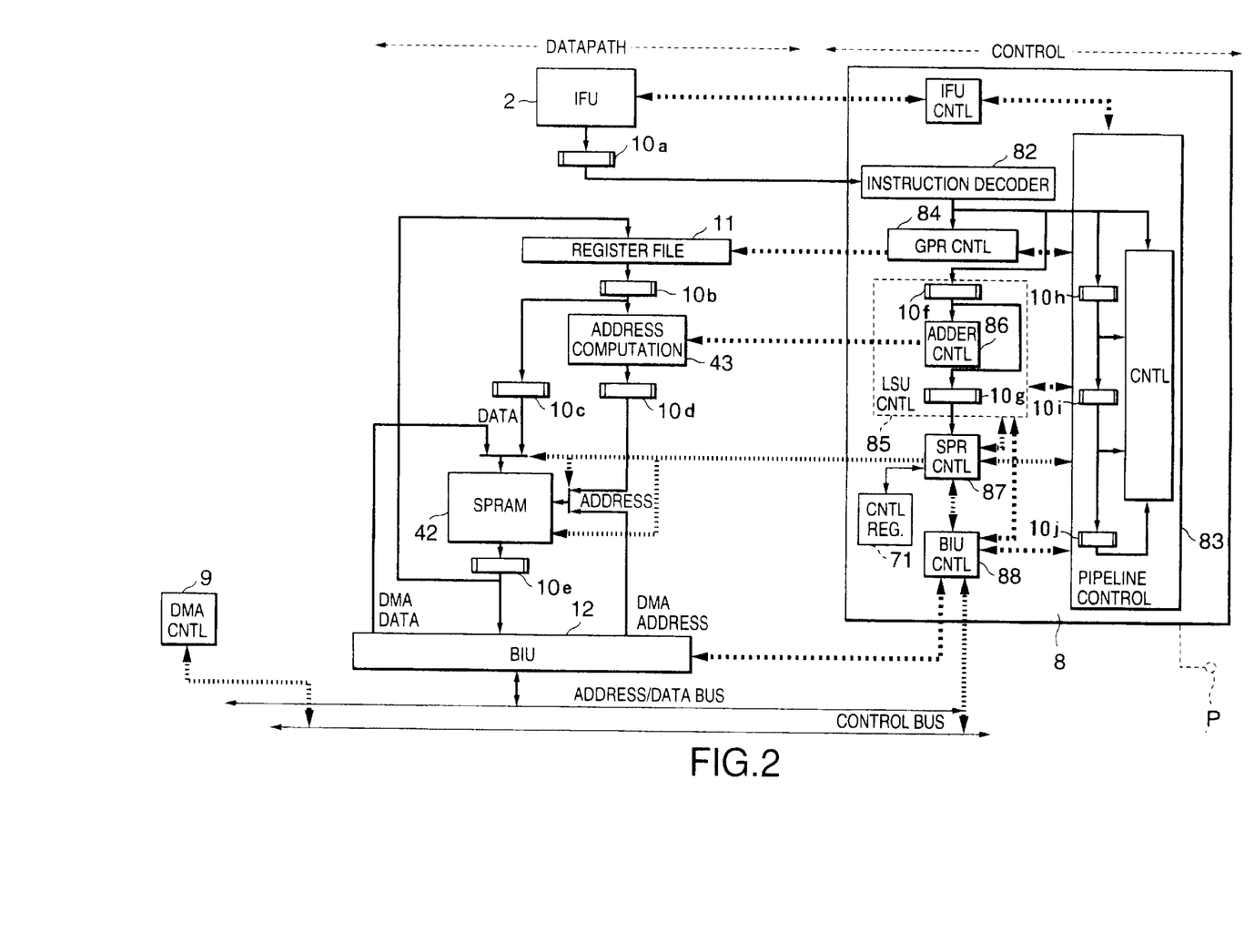
FIG. 2 is a diagram showing a portion of the internal configuration of the LSU shown in FIG. 1.

Next, the load/store operations to the SPRAM 42 will be explained. FIG. 2 is a diagram showing a portion of the internal configuration of the LSU 4 shown in FIG. 1. In FIG. 2, the SPRAM 42 is separately shown in two parts: the control part (Control 8) and the datapath.

The Control 8 of FIG. 2 generates a control signal which is supplied to the Datapath in accordance with the flow of instructions. The Datapath releases data in accordance with the control signal from the Control 8.

In FIG. 2, each line connecting the Control 8 and the Datapath represents a control signal. Usually, the control signal is supplied to the Datapath from the Control 8. There is also a control signal supplied from the Datapath to the Control 8 which is not shown in FIG. 2. For example, when pipeline processes are stopped in accordance with the cache-miss of the ICACHE 22, a miss signal from the TAG of the ICACHE 22, which is a part of the Datapath, is supplied to the Control 8 in order to stop the pipeline processes.

In FIG. 2, the block designated by the reference numeral 10a, 10b, . . . , 10j stands for register structure which separate each of stages executing the pipeline processes. These blocks 10a, 10b, . . . , 10j include circuits with flip-flops and latches, and execute the reading and the writing processes in sync with a clock. Hereinafter, the blocks 10a, 10b, . . . , 10j are called pipeline registers.

The IFU 2 stores the fetched instructions in the pipeline register 10 based on control of an IFU Control 81. The instructions are sent from the pipeline register 10a to a Instruction Decoder 82. The Instruction Decoder 82 generates a transitive control signal for discrimination and processing of the instructions.

When the Instruction Decoder 82 recognizes that the fetched instructions are the load/store instructions, a control signal group is sent to the relative Control Logic block. In other words, as shown in FIG. 2, the control signal group is sent to a Pipeline Control 83, a GPR (General Purpose Register) Control 84, and an LSU Control 85.

In the Pipeline Control 83 and the LSU Control 85, the instructions and the control signals flow in sync with stages of data flow, and the pipeline registers 10a, 10b, ..., 10j are provided for both the Control 8 and the Datapath.

The Pipeline Control 83 controls the flow of the pipeline in accordance with the internal condition of the inside of the pipeline register 10a, 10b, ..., 10j. For example, when a resource hazard occurs on the calculator, processes which stop the pipeline are executed.

The LSU Control 85 generates the control signal to execute the load/store instruction. That is, data sent from a register file 1 to the pipeline register 10b by control of the GPR Control 84 is sent to an address generator 43 in order to generate the addresses. The Address Generator 43 is controlled by the Adder Control 86. The addresses generated by the Address Generator 43 are sent to the pipeline register 10d of the next stage.

An SPR (SPRAM) Control 87 accesses the SPRAM based on signals from the Pipeline Control 83 and the LSU Control 85. At this time, the address of the pipeline register 10d is used. When this address corresponds to a load instruction, a read enable signal is asserted, and a write enable signal is deasserted into invalidity. Accordingly, data in the SPRAM 42 is read out and stored in the pipeline register 10e. The stored data is written to the register file 11 at next stage.

When the address in the pipeline register 10d corresponds to the store instruction, the read enable signal is deasserted, and the write enable signal is asserted. Accordingly, data staged from the register file 11 is written into the SPRAM 42.

On the other hand, a DMA (Direct Memory Access) controller 9 provided external to the processor is, as shown in FIG. 2, connected to a BIU Control 88 in the processor via an external bus. When the DMA controller 9 sends the control signal to the BIU Control 88 and then the DMA process is started, the BIU Control 88 sends a signal to the SPR Control 87 in order to execute the reading or writing operation for the SPRAM 42. That is, the SPR Control 87 is also connected indirectly to the DMA controller 9 via the BIU Control 88.

When access to the SPRAM is requested by both the LSU 4 and the BIU (the source of the access requirement from the BIU 12 is the DMA controller 9), the SPR Control 87 arbitrates requirements from both in order to determine the enable signal group, and changes a selector of the inputted address and data.

For example, in order to programmably control the priority of access to the SPRAM 42 by the LSU 4 and the BIU 12, as shown by the dotted line in FIG. 2, a control register 71 may be connected to the SPR Control, and the value of the control register 71 may be programmably changed in accordance with the priority.

The SPRAM 42 shown in FIG. 1 and FIG. 2 is valuable as a temporary memo pad region on the occasion processing a plenty of data such as image data are being processed.

Figure 3:
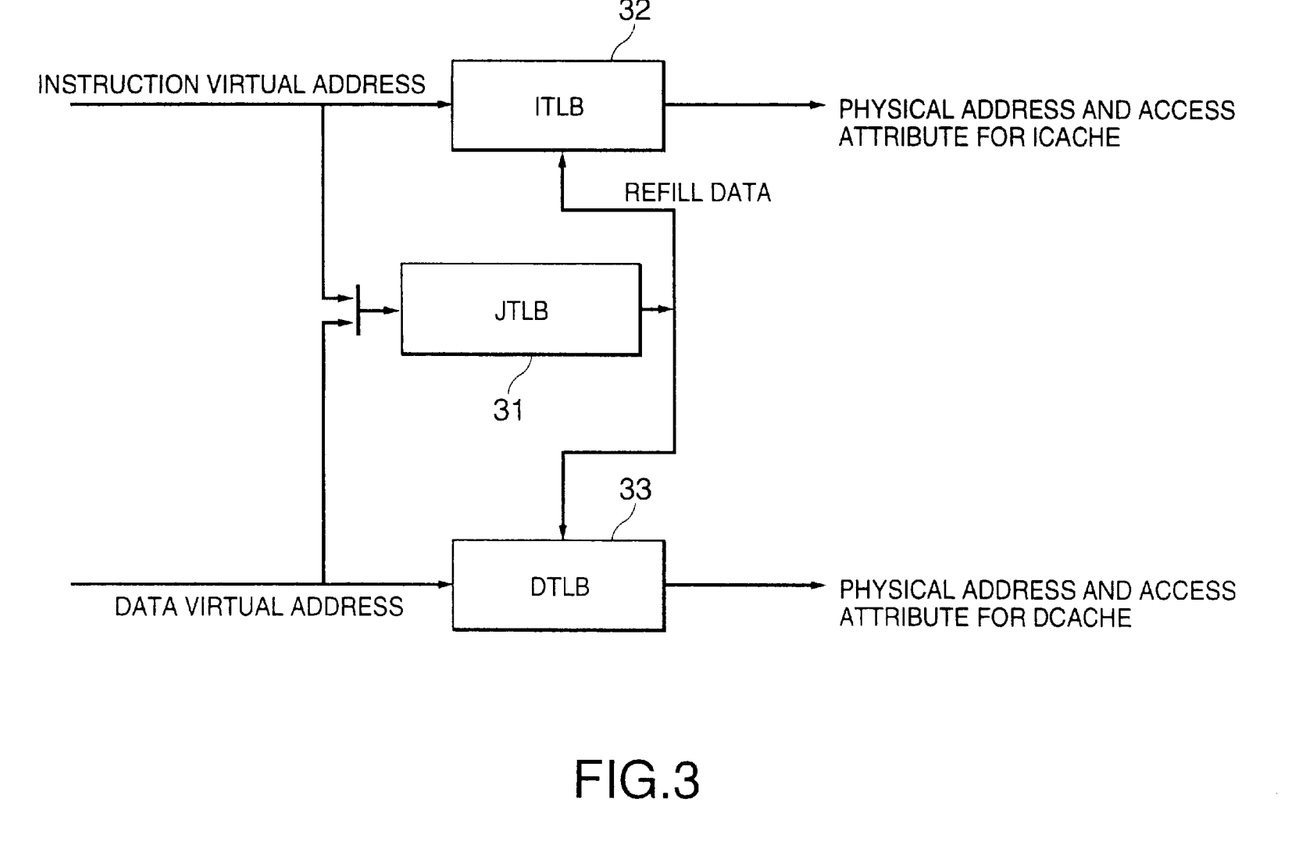
FIG. 3 is a diagram showing the connection inside the MMU.

FIG. 3 is a diagram showing the connection inside the MMU 3. As mentioned above, three TLBs are provided inside the MMU 3. Among these TLBs, the JTLB 31 is a true TLB. The JTLB 31 has, for example, 48 entries, and by mapping the virtual address by each page, generates a conversion table to convert to the physical address.

The conversion table 100 generated by the JTLB 31 is copied to the ITLB 32 and the DTLB 33. It takes much time to perform the conversion process, because the JTLB 31 has many entries. Accordingly, only the portion which is necessary to generate in the conversion table 100 is copied to the ITLB 32 or the DTLB 33 in order to perform the conversion process at high speed.

Figure 4:
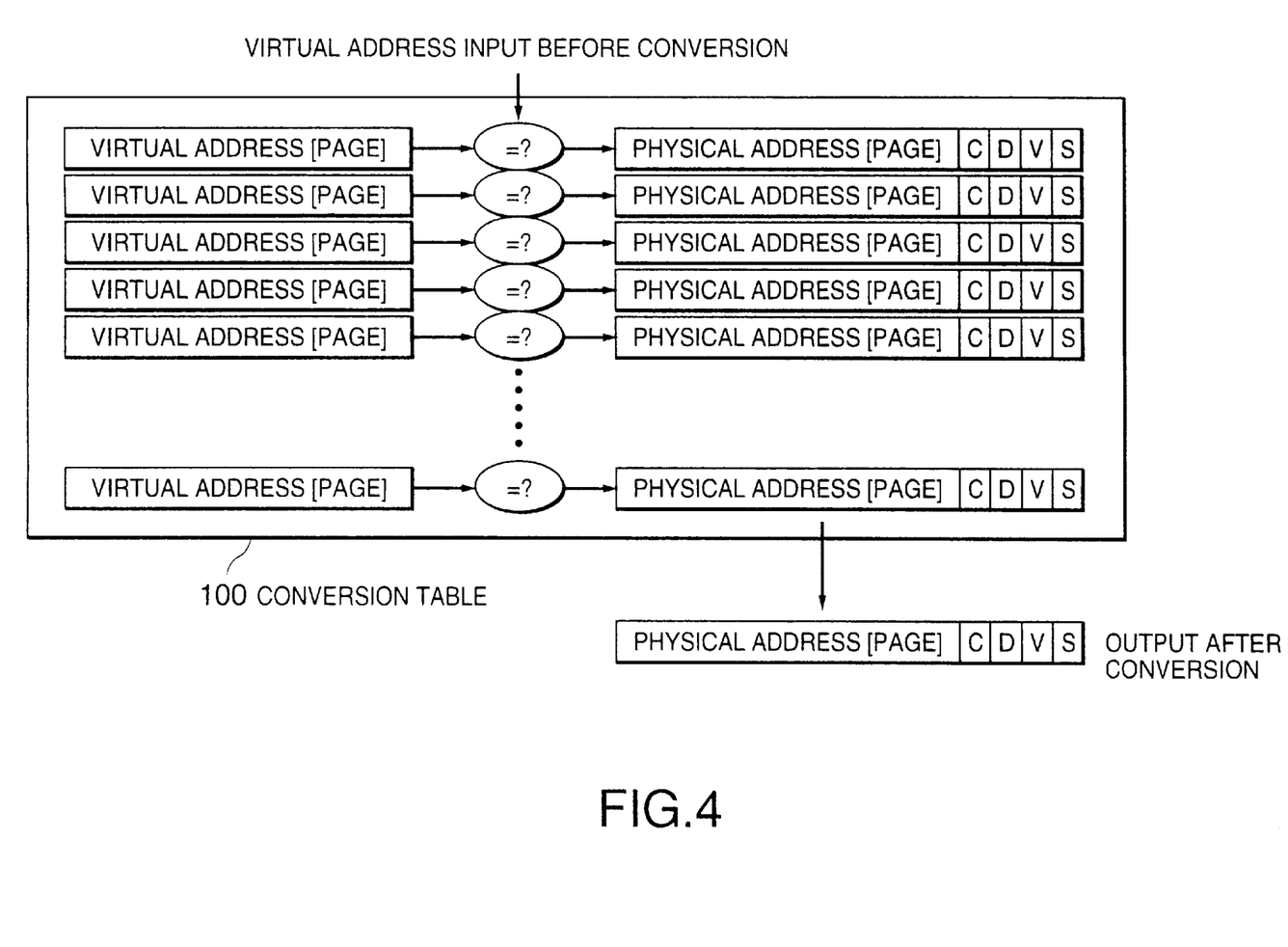
FIG. 4 is a diagram of a typical conversion table in the JTLB.

FIG. 4 is a diagram of a typical conversion table 100 in the JTLB 31. In the conversion table 100, the page number of the virtual address, the corresponding physical address, and a flag information correspond to each other.

The flag information includes a C flag showing whether or not the cache is allowable, a D flag showing whether writing to the memory is allowable, a V flag showing whether the conversion entry is valid, and a S flag (a first flag information) showing whether or not the access to SPRAM is performed.

If the S flag is set, the LSU 4 absolutely accesses the SPRAM 42. Specifically, by using an offset address at lower side of the virtual address, the access to the SPRAM 42 is performed. Therefore, it is unnecessary to allocate the SPRAM 42 on the memory map of the main memory; accordingly, the allocation of the memory is simplified.

When the S flag is set, the result of the cache-hit and the cache-miss is ignored, and the access to the SPRAM is performed. Therefore, because it is possible to access the SPRAM 42 without confirming if the caching hits or misses, it is possible to read out from and write into the SPRAM 42 at high speed.

In the above mentioned embodiment, an example having four types of flags has been explained, and the types and the number of the flags are not limited. For example, the flag for the access to the I/O region may be provided. Hereinafter, this flag is tentatively called an I/O flag (a second flag information).

When access to the I/O region is performed, it is desirable to inhibit the use of the cache memory and to assure the order of reading out from and writing into the memory.

Figure 5:
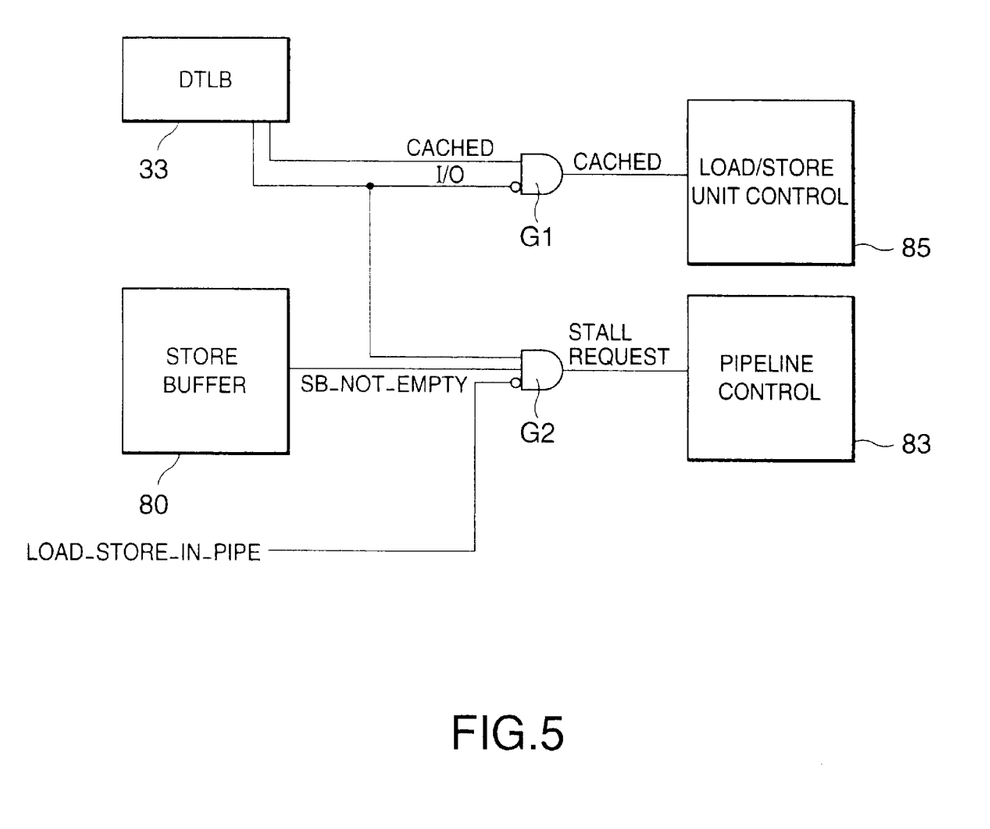
FIG. 5 is a circuit diagram showing an example of the system assuring the end of the store instruction prior to the load/store instruction executed for the address mapped as the I/O region.

FIG. 5 is a circuit diagram showing an example of the system assuring the end of the store instruction prior to the load/store instruction being executed for the address mapped as the I/O region. The store buffer 80 of FIG. 5 is used to temporarily store all of the writing data.

When the C flag is set and the I/O flag is not set, the high level signal (Cached signal) permitting the use of the ICACHE 22 or the DCACHE 41 is supplied to an LSU Control 85.

Furthermore, when the I/O flag is set, data not written yet exists in the store buffer 80, and the valid load/store instruction exists in the LSU 4, a high-level signal (Stall-Request signal) to stall the load/store instruction for the access of the I/O region is supplied to a pipeline control logic 83.

By providing a circuit such as FIG. 5, even if the order of executing the load/store instruction in a system is not assured, by adding a minimal circuit, it is possible to assure the end of the precedent store instruction prior to the access to the I/O region.

Thus, by providing the I/O flag, it becomes unnecessary to allocate the I/O region to the memory map of the main memory. Furthermore, if the I/O flag is set, because it is possible to forcibly invalidate the cache and to assure the order of the writing to the memory, it is possible to access the I/O region easily and quickly.

Though an example of the SPRAM which is able to perform the DMA transfer has been explained, the DMA transfer is not always inevitable for the above mentioned SPRAM. For example, the SPRAM not performing the DMA transfer is used as a temporary depository of data generated continuously by the processor.

What is claimed is:
1. A microprocessor comprising:
   a memory management unit for converting a first address to a second address;

a load/store instruction executing part configured to execute a load/store instruction; and a first memory configured to be accessed only by the first address, not to be mapped on a memory map of a main memory accessed by the second address, and not to require consistency of data with said main memory;

wherein said memory management unit includes a flag information generating part configured to generate a first flag information showing whether or not to perform an access to said first memory, said memory management unit accessing said main memory whose addresses are allocated by using the second address and accessing said first memory by using an offset address at lower side of the first address based on said first flag information.

2. The microprocessor according to claim 1, further comprising:

a second memory configured to temporarily store data to be written to or be read from said main memory, and to require consistency of data with said main memory.

3. The microprocessor according to claim 2, wherein said second memory is a cache memory.

4. The microprocessor according to claim 1, wherein the first address is a virtual address, and the second address is a physical address.

5. The microprocessor according to claim 1, wherein said memory management unit includes a table generating part configured to generate a conversion table to convert the first address to the second address by each page having a constant memory capacity; and said flag information generating part stores said first flag information corresponding to the first address to said conversion table.

6. The microprocessor according to claim 1, wherein said flag information generating part generates a second flag information showing whether or not to perform an access to a I/O region.

7. The microprocessor according to claim 6, further comprising:

a cache memory configured to temporarily store data to be written to or be read from said main memory, and to require consistency of data with said main memory, wherein said memory management unit accesses the I/O region regardless of a cache-hit or a cache-miss for said cache memory when accessing the I/O region based on said second flag information.

8. The microprocessor according to claim 6, further comprising:

a store buffer configured to temporarily store data to be stored to said first memory before the data is stored to said first memory, wherein when said memory management unit accesses the I/O region based on said second flag information, said load/store instruction executing part holds the valid load/store instruction for said first memory, and if data not yet being written exists in said store buffer, the access to the I/O region is temporarily stopped.

9. The microprocessor according to claim 6, wherein said memory management unit includes a table generating part configured to generate a conversion table converting the first address to the second address by each page having a constant memory capacity, and said flag information generating part stores said second flag information by each page to the conversion table.

10. A microprocessor comprising:

a memory management unit configured to convert a first address to a second address;

a load/store instruction executing part configured to execute a load/store instruction;

a main memory accessed via a bus by designating the second address; and a first memory configured to be accessed only by the first address, not to be mapped on a memory map of said main memory accessed by the second address, and not to require consistency of data with said main memory;

wherein said memory management unit includes a flag information generating part configured to generate a first flag information showing whether or not to perform an access to said first memory, said memory management unit accessing said main memory whose addresses are allocated by using the second address and accessing said first memory by using an offset address at lower side of the first address based on said first flag information.

11. The microprocessor according to claim 10, further comprising:

a second memory configured to temporarily store data to be written to or be read from said main memory, and to require consistency of data with said main memory.

12. The microprocessor according to claim 11, wherein said second memory is a cache memory.

13. The microprocessor according to claim 10, wherein the first address is a virtual address, and the second address is a physical address.

14. The microprocessor according to claim 10, wherein said memory management unit includes a table generating part configured to generate a conversion table to convert the first address to the second address by each page having a constant memory capacity; and said flag information generating part stores said first flag information corresponding to the first address to said conversion table.

15. The microprocessor according to claim 10, wherein said flag information generating part generates a second flag information showing whether or not to perform an access to a I/O region.

16. The microprocessor according to claim 15, further comprising:

a cache memory configured to temporarily store data to be written to or be read from said main memory, and to require consistency of data with said main memory, wherein said memory management unit accesses the I/O region regardless of a cache-hit or a cache-miss for said cache memory when accessing the I/O region based on said second flag information.

17. The microprocessor according to claim 15, further comprising:

a store buffer configured to temporarily store data to be stored to said first memory before the data is stored to said first memory, wherein when said memory management unit accesses the I/O region based on said second flag information, said load/store instruction executing part holds the valid load/store instruction for said first memory, and if data not yet being written exists in said store buffer, the access to the I/O region is temporarily stopped.

18. The microprocessor according to claim 15, wherein said memory management unit includes a table generating part configured to generate a conversion table converting the first address to the second address by each page having a constant memory capacity, and said flag information generating part stores said second flag information by each page to the conversion table.

* * * * *